(12) United States Patent
Choi et al.

(10) Patent No.: US 8,639,927 B2
(45) Date of Patent: Jan. 28, 2014

(54) METHOD OF USER-AUTHENTICATED QUANTUM KEY DISTRIBUTION

(75) Inventors: Jeong-Woon Choi, Daejeon (KR); Ku-Young Chang, Daejeon (KR); Nam-Su Jho, Seoul (KR); Do-Won Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 321 days.

(21) Appl. No.: 12/953,198

(22) Filed: Nov. 23, 2010

(65) Prior Publication Data

US 2011/0126011 A1 May 26, 2011

(30) Foreign Application Priority Data

Nov. 24, 2009 (KR) ........................ 10-2009-0113860

(51) Int. Cl.
*H04L 9/32* (2006.01)

(52) U.S. Cl.
USPC .......................................................... 713/168

(58) Field of Classification Search
None
See application file for complete search history.

(56) References Cited

U.S. PATENT DOCUMENTS

| 7,036,364 | B2 | 5/2006 | Swillo et al. | |
|---|---|---|---|---|
| 2004/0109564 | A1* | 6/2004 | Cerf et al. | 380/256 |
| 2004/0161109 | A1 | 8/2004 | Trifonov | |
| 2007/0071245 | A1 | 3/2007 | Kuang | |
| 2007/0140495 | A1 | 6/2007 | Berzanskis et al. | |
| 2009/0106553 | A1* | 4/2009 | Wang | 713/168 |
| 2009/0169015 | A1* | 7/2009 | Watanabe | 380/278 |
| 2009/0175450 | A1* | 7/2009 | Brandt | 380/277 |
| 2009/0175452 | A1* | 7/2009 | Gelfond et al. | 380/277 |
| 2010/0027794 | A1* | 2/2010 | Yuan et al. | 380/255 |
| 2010/0080386 | A1* | 4/2010 | Donnangelo et al. | 380/256 |
| 2010/0293380 | A1* | 11/2010 | Wiseman et al. | 713/169 |
| 2010/0299526 | A1* | 11/2010 | Wiseman et al. | 713/171 |
| 2011/0075839 | A1* | 3/2011 | Noh | 380/44 |
| 2011/0213979 | A1* | 9/2011 | Wiseman et al. | 713/171 |
| 2012/0177201 | A1* | 7/2012 | Ayling et al. | 380/278 |

FOREIGN PATENT DOCUMENTS

WO WO 2004/073234 A2 8/2004

OTHER PUBLICATIONS

Kai Wen and Gui Lu Long, "Modified Bennet-Brassard 1984 quantum key distribution protocol with two-way classical communications," Physical Review A 72, 022336 (2005), pp. 1-5. Retrieved from <http://pra.aps.org/pdf/PRA/v72/i2/e022336> on Nov. 2, 2012.*

Won Young Hwang, In Gyu Koh and Yeaong Deok Han, "Quantum cryptography without public annoucement of bases," Physics Letters A 244 (1998), pp. 489-494. Retrieved from <http://www.sciencedirect.com/science/article/pii/S0375960198003582> on Nov. 2, 2012.*

(Continued)

*Primary Examiner* — Andrew L Nalven
*Assistant Examiner* — Christopher Ruprecht

(57) ABSTRACT

A method of user-authenticated quantum key distribution according to the present invention shares a position having the same basis without making public basis information using previously shared secret keys and authenticates a quantum channel by confirming whether there is the same measured outcome at that position, in order to secure unconditional security of BB84 quantum key distribution (QKD) protocols vulnerable to man-in-the-middle attack.

13 Claims, 2 Drawing Sheets

(56) References Cited

OTHER PUBLICATIONS

Won-Young Hwang, Xiang-Bin Wang, Keiji Matsumoto, Jaewan Kim, and Hai-Woong Lee, Shor-Preskill-type security proof for quantum key distribution without public announcement of bases, Physical Review A 67, 012302 (2003), pp. 1-5. Retrieved from <http://pra.aps.org/pdf/PRA/v67/i1/e012302> on Nov. 2, 2012.*

Kai Wen and Gui Lu Long, "Modified Bennett-Brassard 1984 quantum key distribution protocol with two-way classical communications," Physical Review A 72, 022336 (2005), pp. 1-5. Retrieved from <http://pra.aps.org/pdf/PRA/v72/i2/e022336> on Nov. 2, 2012.*

Claude Crépeau et al., "Quantum Oblivious Mutual Identification", pp. 133-146, Springer-Verlag.

Miloslav Dušek et al., "Quantum identification system", Physical Review A, Sep. 10, 1998, pp. 149-156, vol. 60 No. 1, The American Physical Society.

Charles H. Bennett et al., "Generalized Privacy Amplification," IEEE Transactions on Information Theory, Nov. 1995, pp. 1915-1923, vol. 41, No. 6.

David Elkouss et al., "Efficient reconciliation protocol for discrete-variable quantum key distribution," IEEE International Symposium on Information Theory, 2009, pp. 1-5.

* cited by examiner

METHOD OF USER-AUTHENTICATED QUANTUM KEY DISTRIBUTION

RELATED APPLICATIONS

The present application claims priority to Korean Patent Application Number 10-2009-0113860, filed on Nov. 24, 2009, the entirety of which is hereby incorporated by reference.

BACKGROUND OF THE INVENTION

1. Field of the Invention

The present invention relates to a method to combining a quantum authentication procedure with quantum key distribution protocol, and more particularly, to a user-authentication method for being suitable for a photon transmission based BB84 protocol and guaranteeing the unconditional security of the BB84 protocol.

2. Description of the Related Art

C. H. Bennett and G. Brassard devised BB84 quantum key distribution (hereinafter, referred to as QKD) protocol in 1984, and the quantum cryptography field has rapidly developed in the past 20 years. A core of a QKD protocol generates and shares a secret key for cryptography communication via a published communication channel by two users that are far away from each other and establishes the unconditional security for the shared secret key.

The existing cryptography system implements a secure key distribution protocol by using an asymmetrical key cryptography system but the security of the existing cryptography system has a limitation in securing only computational security due to mathematical complexity.

P. Shor published a specialized quantum algorithm that can solve prime factorization in polynomial time by using quantum fourier transformation, which verifies that the most widely used RSA cryptography system is theoretically not safe. The serial results highlighted the importance of the quantum cryptography. In particular, the fact that the QKD protocol can share the secret key while still providing unconditional security at 140 km or more via a free space and an optical fiber has been theoretically and experimentally verified. Further, the practical examples of the QKD protocol used for various applications such as electronic voting, commercial transaction between banks, military secret communication, etc., have been reported.

However, the main problem of the QKD protocol is that it cannot prevent the man-in-the-middle attack, especially when the authentication procedure for confirming the identity of the user participating in the key distribution protocol is not coupled with the QKD protocol. In this case, the attacker makes it possible to share a secret key with the rightful users, thereby concealing his/her identity from rightful users. The rightful users think that the secret key is shared with another rightful user and uses the secret key in the cipher text. Therefore, the attacker decrypts all communications transmitted between the rightful users hereinafter.

The quantum authentication scheme known up to now is largely classified into two schemes according to a kind of secret key that is previously shared by the users. One scheme previously shares a quantum entangled state and then, is used as a safe quantum channel itself. The other scheme uses a previously shared bit string as an authentication key to authenticate the user, similar to the existing cryptography. The assumption that the quantum entangled state is shared means that it does not allow the communication channels between the users to be interrupted from the entire external environment. Actually, since the communication channel is the intangible channel, there is no need to consider the possibility vulnerable to attack from the outside. However, this scheme necessarily demands that the quantum memory is capable of preserving the quantum entangled state for a long time and the quantum computation for error correction, but the possibility to actually implement the above will not happen in near future.

As a result, the photon transmission-based quantum authentication scheme is considered to be more practical. In this scheme, when the key is repeatedly used, it is difficult to maintain the security consecutively. Therefore, a scheme generally implemented is one that continuously replaces the secret key through QKD protocol. In this case, the method capable of organically coupling the user authentication scheme with the QKD protocol should be considered.

The current commercialized QKD protocol uses the existing authentication scheme and the security depends on the symmetrical key exchange by QKD protocol and the universality of hash functions. However, the length key string for authentication is entirely determined by the amount of transmitted classical messages. Therefore, it is important to reduce the length of required key string, because the amount of key generated by QKD protocol is very limited at a long distance.

SUMMARY OF THE INVENTION

It is an object of the present invention to provide a method of authenticated quantum key distribution capable of confirming whether the user knows a secret key without publishing information on the secret key.

It is another object of the present invention to provide a method for quantum authentication that can be very easily applied to a BB84 protocol.

It is another object of the present invention to provide a method for quantum key distribution to actually perform protocols without needing further quantum resources and using the existing classical cryptography protocols.

It is another object of the present invention to provide a method for quantum key distribution capable of dealing with the inefficiency with devices such as a quantum channel, a laser pulse generator and a photon detector, etc.

It is another object of the present invention to provide a method for quantum key distribution having a unique distinction from QKD protocol developed up to now.

According to an aspect of the present invention, a method of quantum key distribution, by using previously shared secret keys, shares the positions having the same bases without announcing the bases information publicly and authenticates a quantum channel by confirming whether there is the same measured outcome at those positions.

According to another aspect of the present invention, a method of user-authenticated quantum key distribution includes: a quantum transmitting step that generates photons having an randomly polarized state by a sender and transmits the photons to a receiver; a user authentication step that selects a specific positions corresponding to a secret key that are previously shared by the sender and the receiver, and determines whether to authenticate the other party by publishing and exchanging positional information and measured outcomes of the specific positions; an error rate estimating step that estimates an error rate for a position at which the measured outcome is not published; a post-processing step that performs information reconciliation and privacy amplification to post-process the secret key considering the error rate estimated; and a secret key generating step that divides and stores the secret key obtained in the post-processing step into a user authentication key and a communication secret key.

According to another aspect of the present invention, a method of user-authenticated quantum key distribution randomly generates photons having an optional polarized state among $$|0\rangle \cdot |1\rangle \cdot |+\rangle = \frac{|0\rangle + |1\rangle}{\sqrt{2}} \cdot |-\rangle = \frac{|0\rangle - |1\rangle}{\sqrt{2}}$$

using a photon generator by a sender and transmits the generated photons through an optical cable or a free space and a receiver randomly performs measurements under the bases $Z=\{|0\rangle\langle 0|,|1\rangle\langle 1|\}$ or $X=\{|+\rangle\langle +|,|-\rangle\langle -|\}$.

According to another aspect of the present invention, a method of user-authenticated quantum key distribution designates the specific position having the same basis without needing to make public basis information to perform the mutual authentication.

In the method of user-authenticated quantum key distribution according to the present invention, the user authentication step includes determining whether the error rate is in tolerance.

According to another aspect of the present invention, a method of user-authenticated quantum key distribution may be applied to optical transmission-based protocols and quantum entangled state-based protocols.

According to the exemplary embodiment of the present invention, the method for quantum key distribution can expect the following effect.

The method for quantum key distribution is very suitable for the BB84 protocol and performs the authentication without largely deforming the actual BB84 protocol.

The present invention is not limited to further applying a decoy method in order to prevent the photon-number-splitting (PNS) attack.

Unlike the existing user-authenticated QKD protocol, the present invention secures unconditional security using the pure quantum authentication protocol without requiring the existing classical cryptography algorithm.

It can be applied to almost all the cryptography communication protocols as the cryptography primitive module that can simultaneously perform the user authentication and the key distribution.

DETAILED DESCRIPTION OF THE PREFERRED EMBODIMENTS

Figure 1:
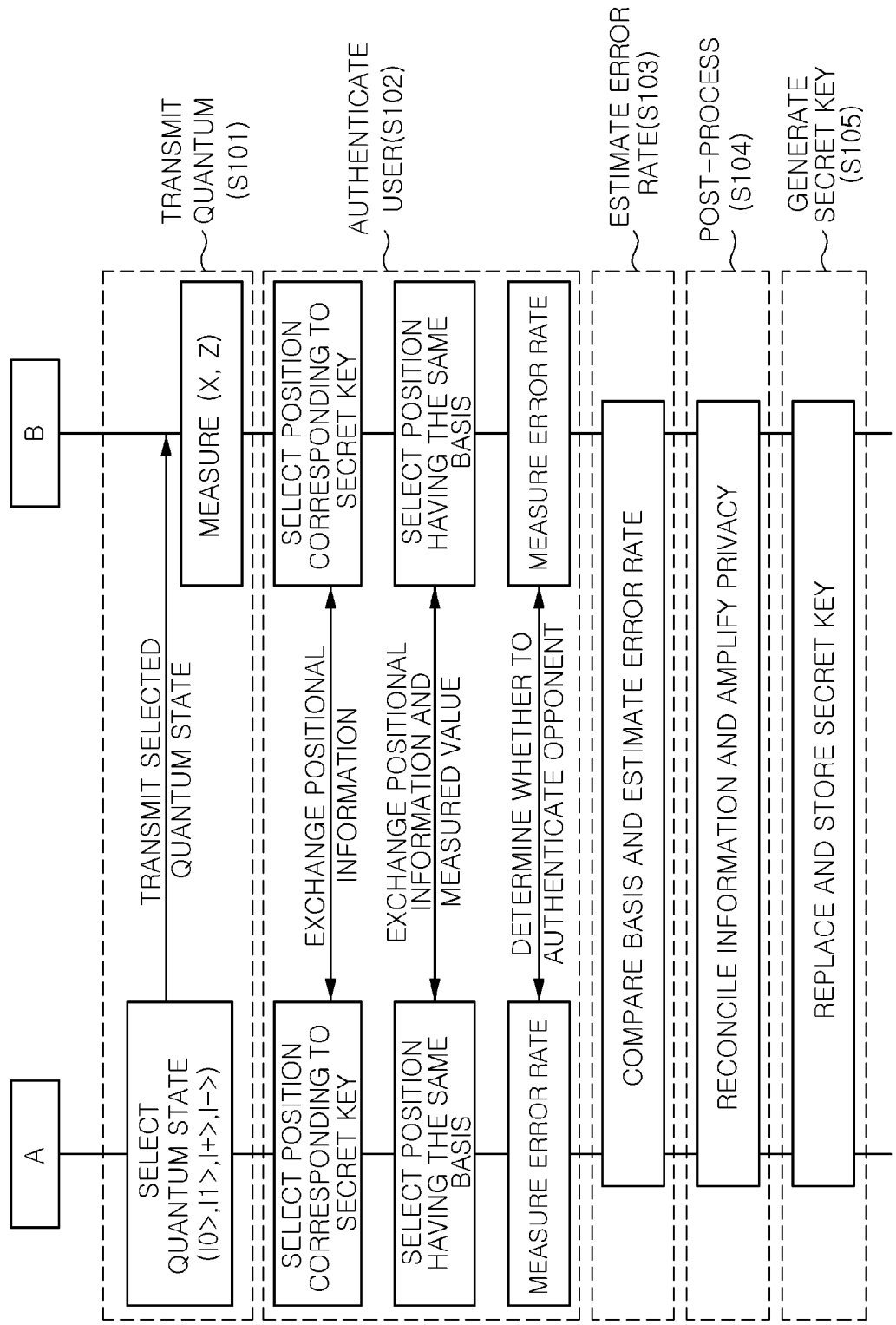
FIG. 1 is a flow chart showing a progressing process of a method of user-authenticated key distribution according to the present invention.

The present invention will be described below with reference to the accompanying drawings. Herein, the detailed description of a related known function or configuration that may make the purpose of the present invention unnecessarily ambiguous in describing the present invention will be omitted. Exemplary embodiments of the present invention are provided so that those skilled in the art may more completely understand the present invention. Accordingly, the shape, the size, etc., of the elements in the drawings may be exaggerated for explicit comprehension.

Hereinafter, a method of user-authenticated key distribution according to the present invention will be described in detail with reference to the accompanying drawings.

FIG. 1 is a flow chart showing a progressing process of a method of user-authenticated key distribution according to the present invention. The progressing process largely includes a quantum transmitting step through transmission and measurement of photon (S101), a user authentication step that checks a specific position having an same basis and compares a measured outcome by using a secret key (S102), an error rate estimating step (S103), a post-processing step through information reconciliation and privacy amplification (S104), and a secret key generating step (S105).

Hereinafter, each step will be described in detail based on a flow chart.

Different users "A" and "B" safely share a secret key $K=(k_1, k_2, \ldots, k_n)$, $k_i \in \{0,1\}$ before performing a protocol. "A" and "B" may be a user on a quantum network which could be expanded to public institutions such as a trusted third party (TTP) or a key distribution center (KDC). The number N of photons detected by "A" and "B" is determined by the transmission distance, the efficiency of a quantum channel, the efficiency of transmitting and receiving apparatus, the amount of information published in the post-processing step of BB84 protocol, and so on. A sufficient amount of photons is transmitted so that the finally obtained key can be obtained more than 2n bits. Note that considering the efficiency of the post-processing step, N should be given greater than 20n when the error rate is about 10%.

First, "A" transmits photons as follows according to randomly generated two bit strings $D_A=(d_1, d_2, \ldots, d_N)$ and $L_A=(l_1, l_2, \ldots, l_N)$.

$$(d_i, l_i)=(0,0) \rightarrow |0\rangle. \quad (d_i, l_i)=(0,1) \rightarrow |1\rangle.$$

$$(d_i, l_i)=(1,0) \rightarrow |+\rangle. \quad (d_i, l_i)=(1,1) \rightarrow |-\rangle.$$

"B" measures by $Z=\{|0\rangle\langle 0|,|1\rangle\langle 1|\}$ if $d'_i=0$ and by $X=\{|+\rangle\langle +|,|-\rangle\langle -|\}$ if $d'_i=1$ according to the randomly generated bit string $D_B=(d_1', d_2', \ldots, d_N')$. $L_B=(l_1', l_2', \ldots, l_N')$ is obtained as the measurement outcomes. When there is no error in the channel and the transmitting and receiving apparatus, "A" and "B" share the same bit $l_i=l_i'$ when $d_i=d_i'$ (S101).

At the user authentication step (S102), "A" performs the following procedure to authenticate "B". "A" randomly selects and publishes the positional information $P_A=(i_1, i_2, \ldots, i_{2n})$. $1 \le i_j \le N$ for a partial bit string of $D_A$ having the same value as $K\|K=(k_1, k_2, \ldots, k_n, k_1, k_2, \ldots, k_n)$. However, all the elements of $P_A$ have different values and satisfy $K\|K=(k_1, k_2, \ldots, k_n, k_1, k_2, \ldots, k_n)=(d_{i_1}, d_{i_2}, \ldots, d_{i_n})$. "B" publishes a partial string $\overline{P}_B$ (approximately n is selected) of $P_A$ consisting of the positional information $i_j$ satisfying $d_{i_j}=d'_{i_j}$ ($1 \le j \le 2n$) with respect to $P_A$ and a partial string $\overline{L}_B$ corresponding to the position. At this time, "A" compares $\overline{L}_B$ to the partial strings $\overline{L}_A$ of $L_A$ corresponding to the position of $\overline{P}_B$ to measure the error degree.

Likewise, in order for "B" to authenticate "A", "B" randomly selects and publishes $P_B$ (however, $P_A \cap P_B = \emptyset$) and "A" progresses authentication procedure while designating $\overline{P}_A$. As a result, if all the error rates are in tolerance, the user is considered to be authenticated and the following process is performed. If not, 'authentication failure' of the protocol is declared and the quantum transmitting step (S101) starts again. When 'authentication failure' exceeds a predetermined frequency, since an eavesdropper can continuously store partial information on the secret key, it informs the users of the existence of an attacker and commands the users to share a safe secret key again by directly communicating with the users.

At the error rate estimating step (S103), "A" and "B" already know the basis information at a position corresponding to $P_A \cup P_B$ and do not have to publish the basis information at the position corresponding to $P_A \cup P_B$. "A" and "B" publish the $D_A$ and $D_B$ information on the remaining portions except for $P_A \cup P_B$ and get about N/2 positions satisfying $d_i = d_i'$. Note that $d_i \neq d_i'$ for $(P_A \cup P_B) \setminus (\overline{P}_A \cup \overline{P}_B)$, while $d_i = d_i'$ for $P_A \cup P_B$. However, since the measured outcomes on $P_A \cup P_B$ are already published at the user authentication step (S102), about N/4–2n positions will satisfy $d_i = d_i'$ except for $\overline{P}_A \cup \overline{P}_B$. The error rate $\epsilon_{est}$ for N/4 bits that is the half of N/2 is obtained by publicly comparing the $L_A$ and $L_B$ information at a corresponding position. Consequently, the error rate for about N/4 remaining positions which do not have the published measured outcomes among portions satisfying $d_i = d_i'$, by the characteristic of the random sampling, may be estimated as $\epsilon_{est}$ which is very high probability.

At the post-processing step (S104), "A" and "B" appropriately selects and performs the information reconciliation and the privacy amplification, considering the error rate $\epsilon_{est}$ that is obtained at the error rate estimating step (S103). In other words, "A" and "B" performs information reconciliation and privacy amplification to share a key string without revealing any information of it to attackers. Thereby, "A" and "B" become to share approximately αN secret keys secure against an attacker. Generally, when the error rate is within 10%, α≥0.1 can be approximately given by the post-processing protocol such as a Modified Cascade protocol.

At the secret key generating step (S105), the first n bits of the secret key string obtained through the post-processing step (S104) are stored for the following user authentication test and the remaining αN-n secret keys are used as the secret keys for the cryptography communication.

Security against the man-in-the-middle attack method is described in detail as follows. It is assumed that the attacker interrupts both the quantum channel and the classical channel between the users and generates again a new channel associated with the attacker. At this time, when the attacker measures the photons transmitted from "A" or performs the coherent attack with an auxiliary system, if there is no information on the polarized bases encoded by "A", the attacker cannot obtain the perfect information of $L_A$. Since the quantum state already transmitted from "A" is deformed by such an attack, "B" also cannot obtain the information of $L_A$. In other words, at the user authentication step (S102), the mutual information of $$\left( I(A:B) = -\sum_{a,b} p(a,b) \log \frac{p(a)p(b)}{p(a,b)} \right)$$

of the bit information published at the positions of $\overline{P}_A$ and $\overline{P}_B$ is not higher than the mutual information I(A:E) between "A" and attacker and the mutual information I(B:E) between "B" and attacker. As a result, both of the attacker and "B" cannot answer the real bit information to "A" in the authentication step (S102). In the ideal situation where there is no error on the quantum channel, the attacker is detected at the probability of $$1 - \left(\frac{3}{4}\right)^n$$

similar to the BB84 protocol during the process that "A" authenticates "B" or

"B" authenticates "A" and the length n of the key is determined to be sufficiently large so that the detected probability can be made to asymptotically approach to 1.

Figure 2:
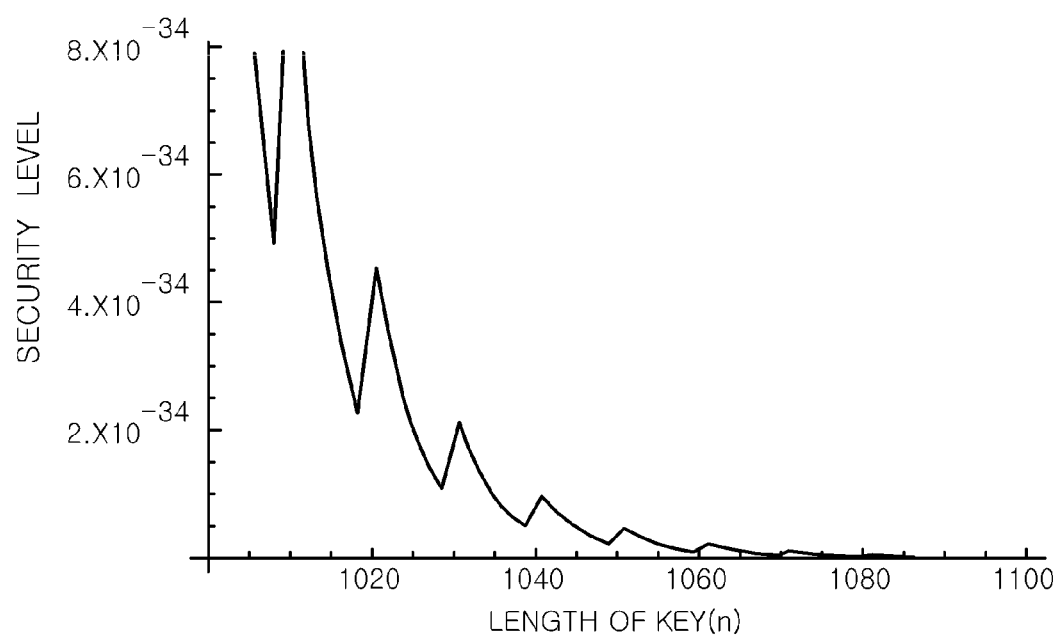
FIG. 2 is an exemplified diagram showing the probability of success of the attacker due to the length of the key according to the exemplary embodiment of the present invention.

It is assumed that an error rate of a degree is allowed. For example, if the error of about 10% due to the attacker is allowed, the probability of success by the attacker is about $$\sum_{k=0}^{[0.1n]} \binom{n}{k} \left(\frac{1}{4}\right)^k \left(\frac{3}{4}\right)^{n-k},$$

even though much or less errors could occur according to the security of the quantum channel. When n is 1000 or more, the probability of success due to the attacker is lower bounded to $10^{-30}$ or less which is generally demanded security level as shown in a graph of FIG. 2. FIG. 2 is an example showing the probability of success of the attacker due to the length of the key according to the exemplary embodiment of the present invention.

The situation where the attacker performs only a simple eavesdropping, not an active attack such as the above-mentioned man-in-the-middle attack can be described as follows. Since eavesdropped portion on the secret key at the user authentication step (S102) will be replaced with the newly obtained key at the secret key generating step (S105), there is no ground. The information of an attacker on the final key will be obtained additionally through eavesdropping at a process after the error rate estimating step (S103). However, since even the partial information from the post-processing will approach to 0 by the privacy amplification, the unconditional security for the final key can be guaranteed.

However, the above-mentioned security analysis is meaningful under the assumption that only single photons are transmitted. Actually, multi-photons are frequently transmitted at a considerable probability due to the technical limit. There is an efficient eavesdropping strategy such as a photon-number-splitting that intercepts one of the plurality of photons. However, this attack can be prevented by a decoy method. Since applying the Decoy method at the quantum transmitting step (S101) does not disturb the execution of all the following steps, the security against the PNS attack is also ensured.

The protocol proposed in the present invention is implemented through the following quantum device. The quantum transmitting step (S101) generates the photons having the randomly polarized state through a photon generator, transmits the generated photons through the optical cable or the free space, and detects the polarization of the photon through a photon detector. All the following steps transmit and receive the bit string information through the classical channel. The difference with the existing protocols is that there is no need to apply the existing classical cryptographic algorithm such as a message authentication code based on universal class of hash functions to the classical channel in order to authenticate the user's identity. Furthermore, the present invention does not use the quantum devices that can be theoretically implemented but is difficult to be practically implemented, such as the quantum memory, the quantum error correction code, the quantum computation. In fact, it has a simpler and more efficient structure than any user-authenticated QKD protocols that have been commercialized up to now.

Although the user authentication scheme according to the present invention is described with reference to the BB84 protocol in order to describe efficiency and implementation, it can be applied to all the optical transmission-based and quantum entangled state-based QKD protocols that have been developed up to now, such as B92, SARG04, EPR protocols, etc. In addition, when the error rate of the quantum channel is not constant in the present invention, the sequence of the error rate estimating step (S103) and the user authentication step (S102) may be reversed and this order may be more natural.

Some steps of the present invention can be implemented as a computer-readable code in a computer-readable recording medium. The computer-readable recording media include all types of recording apparatuses in which data that can be read by a computer system is stored. Examples of the computer-readable recording media include a ROM, a RAM, a CD-ROM, a CD-RW, a magnetic tape, a floppy disk, an HDD, an optical disk, an optical magnetic storage device, etc., and in addition, include a recording medium implemented in the form of a carrier wave (for example, transmission through the Internet). Further, the computer-readable recording media are distributed on computer systems connected through the network, and thus the computer-readable recording media may be stored and executed as the computer-readable code by a distribution scheme.

As described above, the preferred embodiments have been described and illustrated in the drawings and the description. Herein, specific terms have been used, but are just used for the purpose of describing the present invention and are not used for qualifying the meaning or limiting the scope of the present invention, which is disclosed in the appended claims. Therefore, it will be appreciated to those skilled in the art that various modifications are made and other equivalent embodiments are available. Accordingly, the actual technical protection scope of the present invention must be determined by the spirit of the appended claims.

What is claimed is:

1. A method of user-authenticated quantum key distribution, comprising:
   a quantum transmitting step that generates photons having a randomly polarized state by a sender and transmits the photons to a receiver;
   a user authentication step that selects specific positions corresponding to a secret key that are previously shared by the sender and the receiver, and determines whether to authenticate by publishing and exchanging positional information and measured outcomes of the specific positions, wherein the user authentication step designates the specific position having the same basis without needing to make public basis information to perform mutual authentication;
   an error rate estimating step that estimates an error rate for a position at which the measured outcomes are not published;
   a post-processing step that performs information reconciliation and privacy amplification to post-process the secret key considering the error rate; and
   a secret key generating step that divides and stores the secret key obtained in the post-processing step into a user authentication key and a communication secret key.

2. The method of user-authenticated quantum key distribution according to claim 1, wherein the user authentication step includes determining whether the error rate is in tolerance.

3. The method of user-authenticated quantum key distribution according to claim 1, wherein the sender and the receiver are a user on a network expanded to a public institution.

4. The method of user-authenticated quantum key distribution according to claim 1, wherein the method of user-authenticated quantum key distribution is applied to optical transmission-based protocols and quantum entangled state-based protocols.

5. The method of user-authenticated quantum key distribution according to claim 4, wherein the public institution is selected from a trusted third party (TTP) or a key distribution center (KDC).

6. The method of user-authenticated quantum key distribution according to claim 1, wherein the sender selects and publishes positional information for a partial string of the transmitted randomly polarized photons corresponding to part of the secret key previously shared by the sender and the receiver, the receiver publishes positional information for a partial string of the published positional information from the sender, and the sender compares the measured outcomes of the positional information to determine whether to authenticate the receiver.

7. The method of user-authenticated quantum key distribution according to claim 1, wherein the receiver selects and publishes positional information for a partial string of the received randomly polarized photons corresponding to the secret key previously shared by the sender and the receiver, the sender publishes positional information for a partial string of the published positional information, and the receiver compares the measured outcomes of the positional information to determine whether to authenticate the sender.

8. The method of user-authenticated quantum key distribution according to claim 1, wherein in the quantum transmitting step, the sender randomly generates and sends to the receiver two bit strings $$D_A = (d_1, d_2, \ldots, d_N) \text{ and } L_A = (l_1, l_2, \ldots, l_N), \text{ where}$$

$$(d_i, l_i) = (0,0) \rightarrow |0\rangle, (d_i, l_i) = (0,1) \rightarrow |1\rangle.$$

$$(d_i, l_i) = (1,0) \rightarrow |+\rangle, (d_i, l_i) = (1,1) \rightarrow |-\rangle.$$

9. The method of user-authenticated quantum key distribution according to claim 8, wherein in the quantum transmitting step, the receiver measures $$Z = \{|0\rangle\langle 0|, |1\rangle\langle 1|\} \text{ if } d'_i = 0 \text{ and or } X = \{|+\rangle\langle +|, |-\rangle\langle -|\} \text{ if } d'_i = 1$$

using a randomly generated bit string $$D_B = (d'_1, d'_2, \ldots, d'_N)$$

to obtain measured outcomes $$L_B = (l'_1, l'_2, \ldots, l'_N)$$

10. The method of user-authenticated quantum key distribution according to claim 8,
   wherein before the quantum transmitting step, the sender and receiver share a secret key $$k = (k_1, k_2, \ldots, k_n), k_3 \in \{0, 1\},$$

wherein in the user authentication step, the sender randomly selects and publishes positional information $$P_A = (i_1, i_2, \ldots, i_{2n}), 1 \leq i_j \leq N$$

for a partial bit string of $D_A$ having the same value as $$K \| K = (k_1, k_2, \ldots, k_n, k_1, k_2, \ldots, k_n),$$

where all elements of $P_A$ have different values and satisfy $$K \| K = (k_1, k_2, \ldots, k_n, k_1, k_2, \ldots, k_n) = (d_{i_1}, d_{i_2}, \ldots, d_{i_{2n}}), \text{ and}$$

the receiver publishes a partial string $\overline{P}_B$ of $P_A$ having positional information $i_j$ where $d_{i_1}=d'_{i_2}(1 \le j \le 2n)$ with respect to $P_A$, and a partial string $\overline{L}_B$ corresponding to the position, and wherein the sender compares $\overline{L}_B$ to $\overline{L}_A$ of $\overline{L}_A$ corresponding to the position of $\overline{P}_B$ to determine whether to authenticate the receiver.

11. The method of user-authenticated quantum key distribution according to claim 10, wherein the determination of whether to authenticate the receiver includes calculation of error rates.

12. The method of user-authenticated quantum key distribution according to claim 10, wherein in the user authentication step, the receiver randomly selects and publishes positional information $P_B$, where $P_A \cap P_B = \emptyset$, and the sender publishes a partial string $\overline{P}_A$ of $P_B$.

13. The method of user-authenticated quantum key distribution according to claim 12, wherein in the error rate estimating step, the sender and the receiver publish portions of $D_A$ and $D_B$ that do not correspond to $P_A \cup P_B$ and that satisfy $d_i = d'_i$, and the error rate is determined by comparing $L_A$ and $L_B$ at the corresponding positions.

* * * * *